(12) United States Patent
Heinloth et al.

(10) Patent No.: US 8,075,228 B2
(45) Date of Patent: Dec. 13, 2011

(54) MILLING CUTTER HEAD

(75) Inventors: Markus Heinloth, Postbauer-Heng (DE); Ralf Klötzer, Langewiesen (DE); Manfred Bauer, Rosstal (DE); Günther Gnibl, Lichtenau (DE); Helmut Klein, Abenberg (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 643 days.

(21) Appl. No.: 11/989,441

(22) PCT Filed: Jul. 26, 2006

(86) PCT No.: PCT/DE2006/001281
§ 371 (c)(1),
(2), (4) Date: Mar. 5, 2008

(87) PCT Pub. No.: WO2007/022743
PCT Pub. Date: Mar. 1, 2007

(65) Prior Publication Data
US 2009/0097927 A1   Apr. 16, 2009

(30) Foreign Application Priority Data

Aug. 23, 2005  (DE) .................. 20 2005 013 360 U
Mar. 13, 2006  (DE) .................. 20 2006 004 083 U

(51) Int. Cl.
*B23C 5/24* (2006.01)
(52) U.S. Cl. ............................................. 407/38; 407/87
(58) Field of Classification Search .................. 407/34, 407/35, 36, 37, 41, 43, 44, 46, 38, 70, 94, 407/86, 87, 88
See application file for complete search history.

(56) References Cited

U.S. PATENT DOCUMENTS

| | | | | | |
|---|---|---|---|---|---|
| 3,069,937 | A | * | 12/1962 | Thurston | 408/146 |
| 3,339,257 | A | * | 9/1967 | Hargreaves et al. | 407/38 |
| 3,802,043 | A | * | 4/1974 | Garih | 407/36 |
| 4,231,691 | A | * | 11/1980 | Pape et al. | 408/185 |
| 4,544,309 | A | * | 10/1985 | Krstovic | 408/157 |
| 4,848,977 | A | * | 7/1989 | Kieninger | 407/39 |
| 7,114,890 | B2 | * | 10/2006 | Noggle | 407/36 |

FOREIGN PATENT DOCUMENTS

| | | | |
|---|---|---|---|
| DE | 352877 | C * | 5/1922 |
| DE | 519 891 | | 2/1931 |
| DE | 519691 | A1 * | 2/1931 |
| DE | 845436 | C * | 7/1952 |
| DE | 40 03 862 | | 2/1991 |
| DE | 4003862 | A1 * | 2/1991 |
| DE | 10 2004 022 360 | | 11/2005 |
| GB | 210 917 | | 2/1924 |

* cited by examiner

*Primary Examiner* — Kenneth E. Peterson
*Assistant Examiner* — Jennifer Swinney
(74) *Attorney, Agent, or Firm* — Larry R. Meenan

(57) ABSTRACT

The invention relates to a milling cutter head having a number of blade supports (11) which are inserted in recesses of a base body (10) and have blades (12), wherein each blade support can be axially displaced by a wedge and fixed in the milling cutter head by clamping elements. According to the invention, the blade supports each have a shank which is arranged in a receiving bore of the base body and can be fixed via a centrally (13) located clamping piece (18).

15 Claims, 3 Drawing Sheets

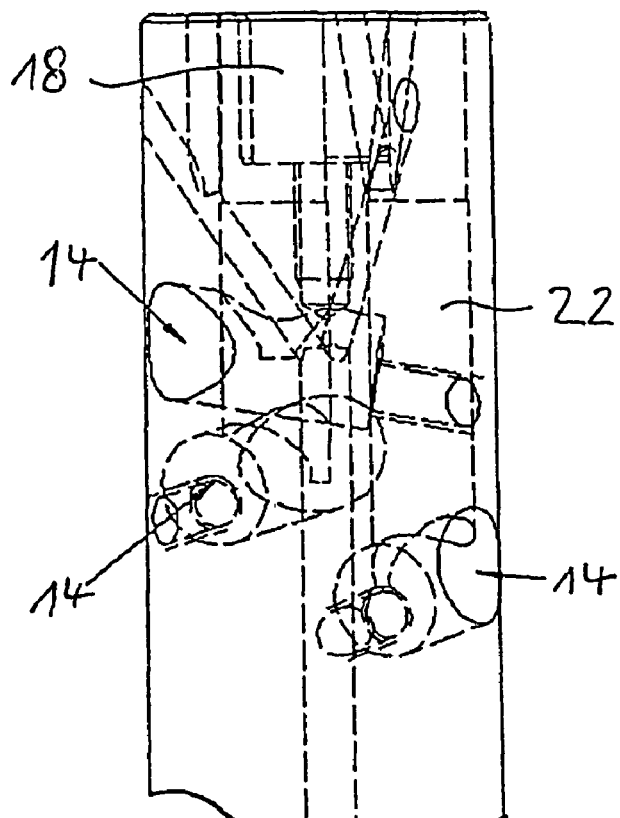
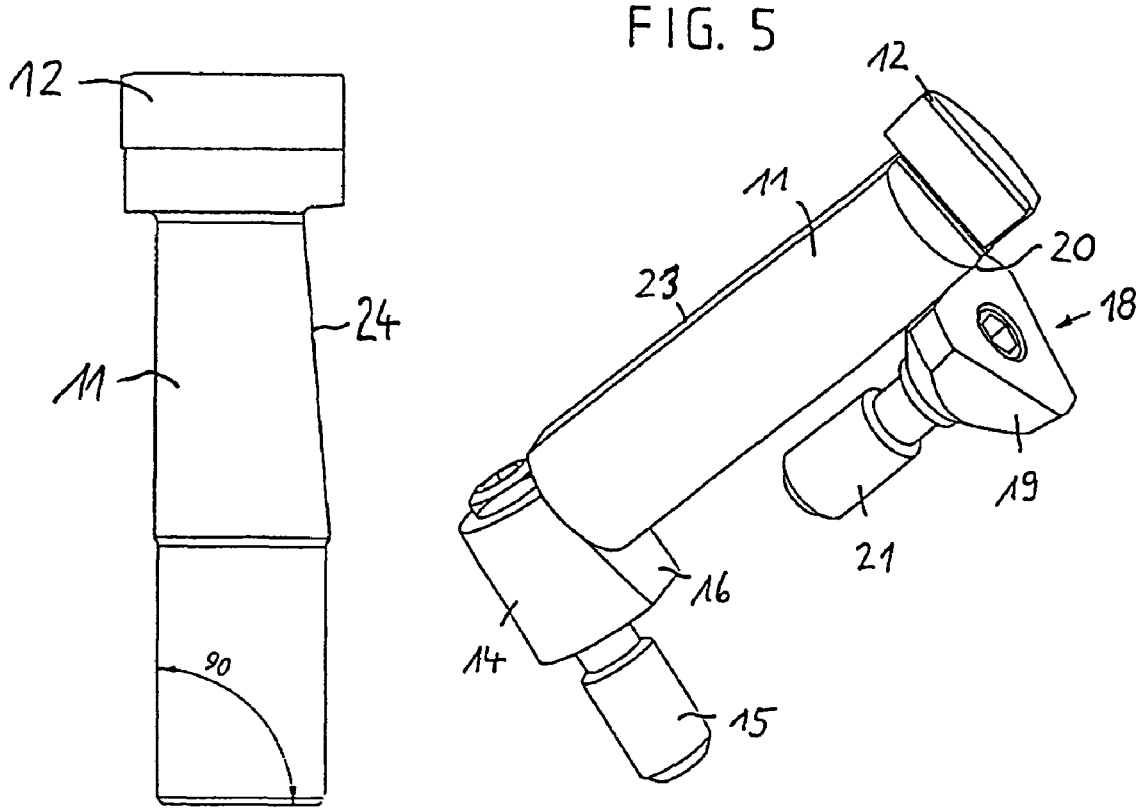

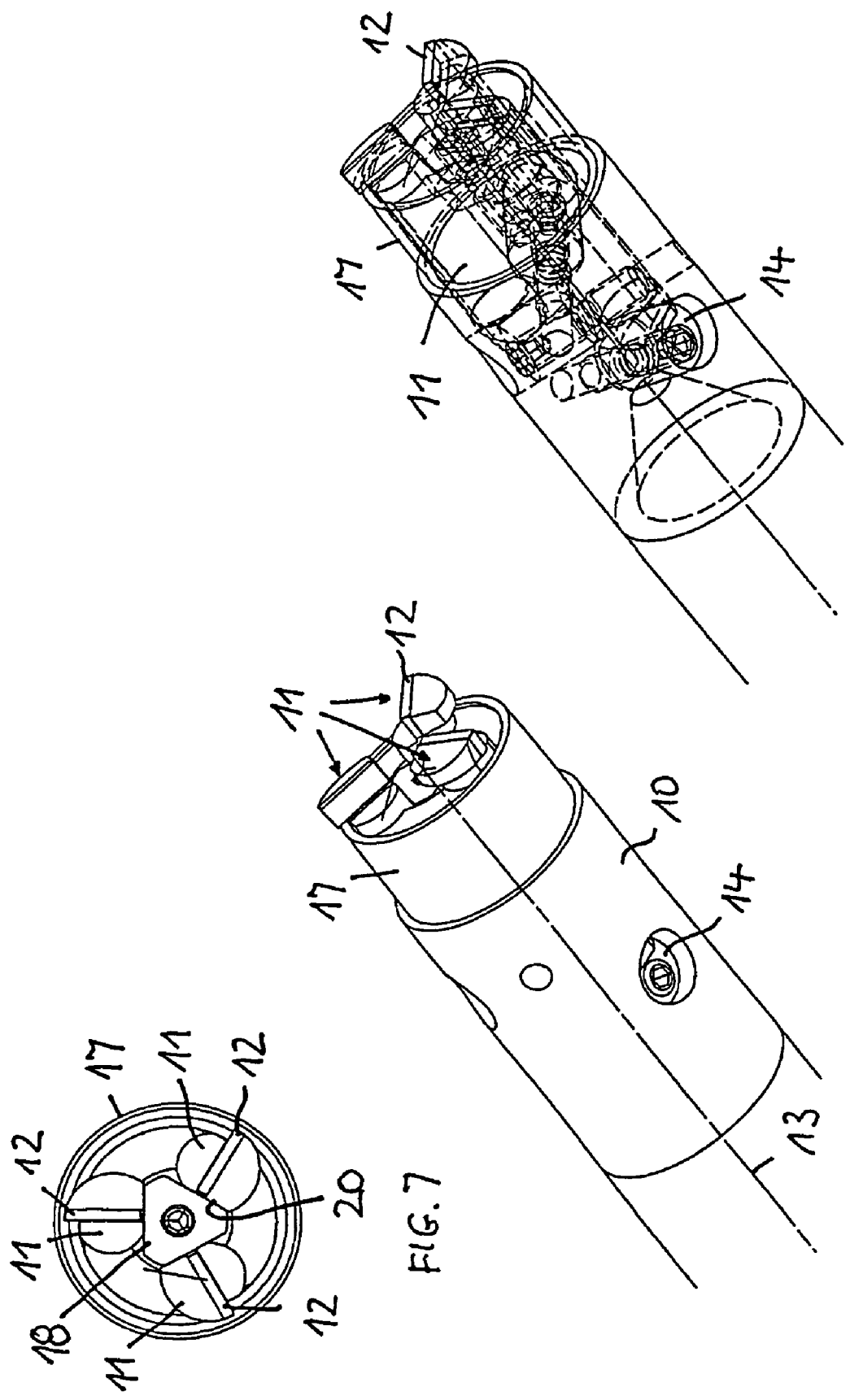

MILLING CUTTER HEAD

CROSS REFERENCE TO RELATED APPLICATIONS

This application is the US national phase of PCT application PCT/DE2006/001281, filed 26 Jul. 2006, published 1 Mar. 2007 as WO 2007/122743, and claiming the priority of German patent application 202005013360.4 itself filed 23 Aug. 2005 and PCT patent application PCT/DE2006/001281 itself filed 26 Jul. 2006, whose entire disclosures are herewith incorporated by reference.

FIELD OF THE INVENTION

The invention relates to a milling head with a plurality of holders with blades fitted in seats of a base body, the blade holders each being axially movable via a wedge and fixable in the milling head by a clamp.

BACKGROUND OF THE INVENTION

Such a milling head is known principally from patent DE 40 03 862. The seats for the blade holders in the described head extend from one of the end faces of its base body parallel to its rotation axis as well as at a distance from its outer periphery where the cutting edges of the cutting plate only slightly protrude over the edge face of the base body. Furthermore, the axes of the round pins used for bracing are respectively skewed to the axes of the cutting plate holder bearing the cutting plate. Finally, another round pin is envisaged as well with a differential screw for the axial adjustment of each cutting plate and mounted in a seat that extends from the periphery of the base body radially inward. Geometrically identical round pins are used for the axial adjustment and the radially outwardly directed bracing. An advantage of this milling head is that as a result of the position of the seats holding the cutting plate holders parallel to the rotation axis of the base body, only radially directed centrifugal forces without axial components occur. These forces can be well absorbed because the seats are formed not directly on the periphery of the base body, but radially inward at a distance from the periphery. The head is designed in particular for extremely high rotational speeds and the resulting centrifugal forces. Advantageously, a fine adjustment of the cutting components is possible in the axial direction without the interaction of radial components.

When finish machining drive shafts or camshafts, initially a rough machining by rotational reaming, milling or turning is conducted, followed by a fine finishing and then a precision finishing. This last finishing is conducted as the process demands by chamfering or belt grinding, using cooling lubricants.

Alternatively, the use of orthogonal reaming is suggested in the German patent DE 10 2004 022 360. This document also suggests doing the finishing of the workpiece dry or with a minimal amount of cooling lubricant, which is desirable in view of the high disposal costs for the cooling lubricant.

However, a requirement for a fine finishing of drive shafts or camshafts by rotational reaming is an optimal alignment of the set of cutters arranged in the milling head. Any false positioning as well as any cutting error leads to a worse surface quality of the workpiece produced.

OBJECT OF THE INVENTION

It is thus the object of the present invention to develop a milling head that is easily manageable. In particular, this milling head should permit a finishing of drive shafts, in particular, case-hardened drive shafts for cars and satisfy the following criteria:
1. A precise axial positioning of the set of cutters in the present tool head
2. A precise radial arrangement of the set of cutters at equidistant angular dimensions, to avoid contour distortion.
3. A precise planar positioning of all blades.
4. The interchangeability of the blade holders and
5. The possibility of equipping of the blade with different cutting components, both with respect to the composition of the blade as well as to the blade shape.

SUMMARY OF THE INVENTION

This object is attained by a milling head in which the blade holders each have a shank that is fitted in a bore of the base body and that can be fixed by a centrally located retaining element. This milling head has a plurality of blade holders fitted in seats of a base body on which the respective blades are brazed. The blade holders can be axially moved via a wedge and fixed in the milling head by a retaining element.

According to the invention, the blade holders each have a shank that is arranged in a preferably complementary bore of the base body preferably surrounded by an external holddown ring shrink-fitted into the base body and fixed via an axial retaining element.

With the described solution, the blade holders can be precisely positioned by their shaft outer surface. By means of the selected longitudinal axial direction of the blade holders or shanks, no centrifugal forces occur during the rotation of milling head, as, for example, with constructions where the longitudinal axes of the blade holders is arranged to slope toward the rotational axis. Holding the shanks in respective bores of the base body as well as axial fixing by a retaining element produces high guidance accuracy of the blade holders and thus of the blade alignment. All in all, the low height of the holddown assembly can be considered a space-saving advantage. In particular, clamping and releasing can be precisely repeated. Clamping by holddown rings and a centrally located retaining element allow simple manageability as well as a high guidance accuracy of the blade holders and also of the blade alignment. Clamping also has the advantage of a low space-saving blade height. The blade holders can be clamped with repeated precision.

For example, the central retaining element is preferably designed as an n-corner body with n planar edge faces in top view, each planar edge face in the clamped position abutting a planar edge face of a blade holder or shank of a blade holder. The number n corresponds to the number of blade holders used, blade holders preferably being used that are arranged at 120° angular offsets. The retaining element is fastened in the base with a holddown screw, in particular, a hex-socket screw in the base body. This measure provides for a simple assembly of the milling head so blade holders with worn blades may be easily changed. Changing tools simply requires releasing the fastening screw for the retaining element, whereby all the blade holders can be removed effortlessly and replaced by blade holders with fresh blades. Subsequently, the holddown screw is axially reinserted, whereby the n edge faces are angularly oriented. The retaining element is fastened with a holddown screw, preferably a double-threaded screw that is locked in the base body so that a separate fixation is obtained. At this point, the edge faces of the retaining element as well as the corresponding edge faces of the blade holder with respect to the milling head rotation axis are slightly angled.

For axial adjustment of the blades, a wedge is used that is designed as a round pin with a flat wedge face. This round pin sits in a radial bore of the base body and is preferably adjustable via an adjustment screw. According to the preferred design of the invention, the blades on the blade holders consist of hard metal, cubic bornitride (CBN) or a polycrystalline diamond body (PKD) and are preferably brazed to the blade holder.

BRIEF DESCRIPTION OF THE DRAWING

Further developments of the milling head are explained below on the basis of the drawings. Therein:

FIG. 3 is a diagrammatic side view of the milling head according to FIGS. 1 and 2 without blade holders;

FIG. 4 is a side view of a blade holder;

FIG. 5 is a perspective view showing the relative positions of a blade holder, a retaining element, and a wedge for axial alignment;

FIG. 6 is a perspective view of a milling head with three blade holders in another embodiment;

FIG. 7 is a top end view of the milling head according to FIG. 6; and

FIG. 8 is a wire-frame model of the milling head according to FIG. 6.

SPECIFIC DESCRIPTION

Figure 1:
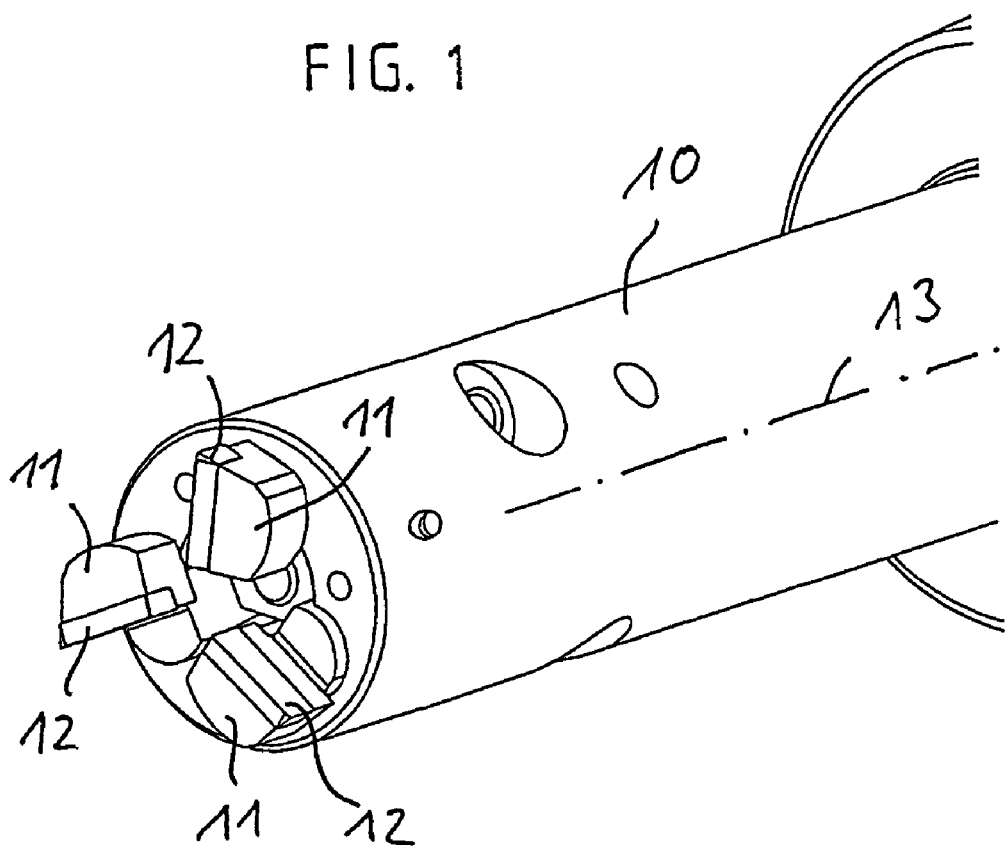
FIG. 1 is a perspective view of a milling head with three blade holders in a first embodiment.
Figure 2:
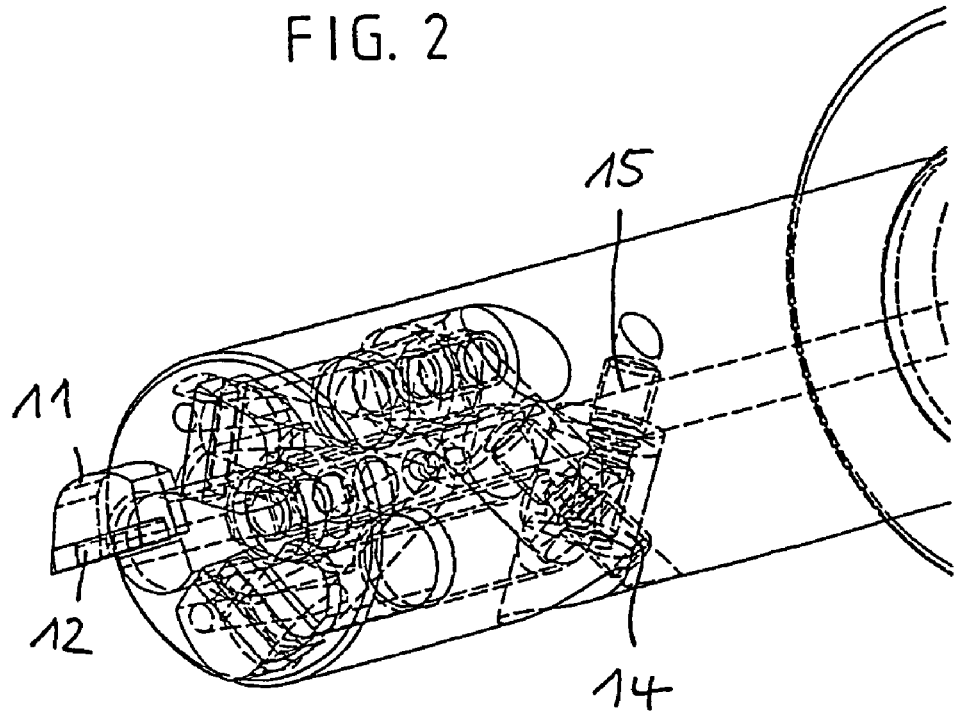
FIG. 2 is a wire-frame model of the milling head according to FIG. 1.

The milling head illustrated in FIGS. 1 to 3 basically comprises a base body 10 in which three blade holders 11 with respectively brazed-on blades 12 are mounted. The blade holders 11 are fitted in respective bores 22 that are parallel to a longitudinal center axis 13 (see FIG. 3). Basically in the radial direction and slightly angled hereto, other bores are provided in the base body 10 in which respective wedges 14 are arranged that can be slid radially via respective adjusting screws 15, preferably double-threaded screws. As can be seen in FIG. 5, these wedges 14 have faces 16 that are angled to a radial plane of the base body, so that radial movement of the wedges 15 slides the respective blade holders 11 along its longitudinal axis, i.e. axially. A retaining element 18 that is centrally located and that has three edge faces 19 that abut corresponding edge faces 20 of the blade holders 11 is used to clamp the blade holders 11. The retaining element 18 can be fixed by a screw 21 that is preferably double-threaded. The retaining element 18 is used in the illustrated case to fix three blade holders 11 that each have a flat edge face 20. By appropriate design of the retaining element 18 and orientation of the edge faces 19 on a triangle, precise alignment of the blades and the blade holders 11 can be achieved so they form a 120° angle with each other (See FIG. 1). Each blade holder 11 can be axially moved via a respective round pin 14 and the respective screw 15. The bores 22 are used for the axially parallel alignment of the blade holders and with it of the set of blades. As illustrated in FIG. 4, the blade holders 11 may also each have an angled surface 24 whose slope corresponds to the slope of an edge face 19 of the retaining element. This ensures that the blade holder 11 is pressed on the edge face 19 in a targeted manner (Due to splitting the holddown force into a radial or axially acting component).

The advantages of the selected embodiment is, in particular, that an exact axial positioning of the blade holders 11 and therewith of the blades is possible and that the entire tool has a compact, self-contained construction that is suitable for high-speed rotation.

The milling head 10 according to FIGS. 6 to 8 comprises basically a base body 10 in which three blade holders 11 are arranged with respectively brazed-on blades 12. The blade holders 11 are fitted in bores running parallel to the longitudinal axis 13. Essentially, in the radial direction or slightly angled thereto, other bores are provided in the base body 10 in which wedges 14 are arranged that can be slid in the radial direction via respective adjusting screws 15, preferably double-threaded. As can be seen in FIG. 5, these wedges 14 have faces 16 that are angled relative to a respective radial plane of the base body, so that during radial movement of the wedges 14, the blade holder 11 can be slid along its longitudinal axis, i.e. axially. A holddown ring 17 (See FIGS. 6 and 7) as well as a retaining element 18 that is centrally located and that has three edge faces 19 that abut the corresponding edge faces 20 of the blade holder are used to clamp the blade holder 11. The retaining element 18 can be fixed by a screw 21 that is preferably double-threaded. The retaining element 18 is used in the illustrated embodiment to fix three blade holders 11 that each have an enclosed edge face 20. By means of the design of the retaining element and the arrangement of the edge faces 19 in a triangular form, precise alignment of the blades and the blade holder at an angle of 120° to one another is achieved. Each blade holder can be axially adjusted via the respective wedge 14 and screw 15. A holddown ring 17, which is a sleeve, is used for the axially parallel alignment of the blade holders 11 and the set of blades 12. The base body 10 and the holddown ring 17 have adjacent cylindrical surfaces. As shown in FIG. 5, each blade holder 11 also has a respective narrow base surface 23 that extends along the longitudinal axis. This surface 23 provides a double line contact between the holddown ring 17 and the set of blade holders.

Due to fixation of the holddown ring, high rotations of the milling head up to 6000 rpm per minute can be realized without loss of machining quality. Only if, due to extremely high rotations, the centrifugal forces acting on the holddown ring exceed decisive values, may holddown ring expansion occur.

The holddown ring is preferably designed in the form of a sleeve and has, in particular, a thickness of 0.5 mm up to 1 mm and/or a height of 75 to 100 mm. With the material used (steel), these dimensions are sufficient to ensure secure fastening of the blade holder up to extremely high rotation speeds.

The blade illustrated is suitable for orthogonal rotary cutting work, in particular for the finishing of drive shafts instead of grinding. Orthogonal rotary cutting can be carried out dry, so that, in contrast to wet grinding that uses a cooling lubricant, further cost advantages can be obtained. The milling head according to the invention achieves high performance in rotation, surface finish quality of the work produced, convexity of the bearing seat and allows economical mass production. In particular, the tool may be used for orthogonal rotary cutting with eccentric adjustment without having to use axial traverse speed if required.

The invention claimed is:

1. A milling head comprising:
   a base body having a plurality of first bores that are substantially parallel to a longitudinal center axis of the base body and a plurality of second bores that are non-parallel to the longitudinal center axis of the base body;
   a plurality of blade holders, each blade holder having a blade mounted thereon, each blade holder having a planar edge face and a shank with a surface having an angle with respect to the center longitudinal axis of the base body, the shank of each blade holder received in a respective first bore of the base body;
a plurality of wedges received in a respective second bore of the base body, each wedge with a wedge face having an angle with respect a plane that is substantially perpendicular to the center longitudinal axis of the base body;
an adjusting screw for moving each wedge within the second bore of the base body along the plane that is substantially perpendicular to the center longitudinal axis of the base body;
a retaining element centrally located with respect to the longitudinal center axis of the base body, the retaining element having a plurality of planar edge faces, each planar edge face abutting a respective planar edge face of the plurality of blade holders to hold the plurality of blade holders securely in place,
wherein movement of each wedge in a direction that is substantially perpendicular to the center longitudinal axis of the base body causes the wedge face of the wedge to press against the planar edge face of the respective blade holder and urge the respective blade holder in an axial direction along the center longitudinal axis of the base body.

2. The milling head according to claim 1, wherein the angle of the surface of the shank of the plurality of blade holders causes a force exerted by of the retaining element against the plurality of blade holders to be equally divided among the plurality of blade holders.

3. The milling head according to claim 1, further comprising a double-threaded screw for securing the retaining element to the base body.

4. The milling head according to claim 1, further comprising a sleeve disposed about the base body to ensure secure fastening of the plurality of blade holders during a machining operation.

5. The milling head according to claim 1, wherein the plurality of blade holders are symmetrically disposed about the retaining element.

6. The milling head according to claim 5, wherein the plurality of blade holder comprise three blade holders with planar edge faces disposed about the retaining element at an angle of 120° with respect to each other.

7. The milling head according to claim 1, wherein the adjusting screw comprises a double-threaded screw.

8. The milling head according to claim 1, wherein each blade comprises hard metal, cubic bornitride or a polycrystalline diamond body that are brazed to a respective blade holder.

9. A milling head comprising:
a base body having a plurality of first bores that are substantially parallel to a longitudinal center axis of the base body and a plurality of second bores that are non-parallel to the longitudinal center axis of the base body;
a plurality of blade holders symmetrically disposed about the central longitudinal axis of the base body, each blade holder having a blade mounted thereon, each blade holder having a planar edge face and a shank with a surface having an angle with respect to the center longitudinal axis of the base body, the shank of each blade holder received in a respective first bore of the base body;
a plurality of wedges received in a respective second bore of the base body, each wedge capable of movement in a radial direction with respect to the center longitudinal axis of the base body, each wedge having a wedge face formed at an angle with respect a plane that is substantially perpendicular to the center longitudinal axis of the base body;
an adjusting screw for moving each wedge within the second bore of the base body along the plane that is substantially perpendicular to the center longitudinal axis of the base body;
a retaining element centrally located with respect to the longitudinal center axis of the base body, the retaining element having a plurality of planar edge faces, each planar edge face abutting a respective planar edge face of the plurality of blade holders to hold the plurality of blade holders securely in place,
wherein movement of each wedge in the radial direction causes the wedge face of the wedge to press against the planar edge face of the respective blade holder and urge the respective blade holder in an axial direction along the center longitudinal axis of the base body.

10. The milling head according to claim 9, wherein the angle of the surface of the shank of the plurality of blade holders causes a force exerted by the retaining element against the plurality of blade holders to be equally divided among the plurality of blade holders.

11. The milling head according to claim 9, further comprising a double-threaded screw for securing the retaining element to the base body.

12. The milling head according to claim 9, further comprising a sleeve disposed about the base body to ensure secure fastening of the plurality of blade holders during a machining operation.

13. The milling head according to claim 9, wherein the plurality of blade holder comprise three blade holders with planar edge faces disposed about the retaining element at an angle of 120° with respect to each other.

14. The milling head according to claim 9, wherein the adjusting screw comprises a double-threaded screw.

15. The milling head according to claim 9, wherein each blade comprises hard metal, cubic bornitride or a polycrystalline diamond body that are brazed to a respective blade holder.

* * * * *